Sept. 8, 1970             T. M. LARSON             3,527,480

MULTIPLE FLUID COUPLING CONNECTION MECHANISM

Filed March 17, 1969             3 Sheets-Sheet 1

INVENTOR:
THOMAS M. LARSON

BY: James E. Nilles
ATTORNEY

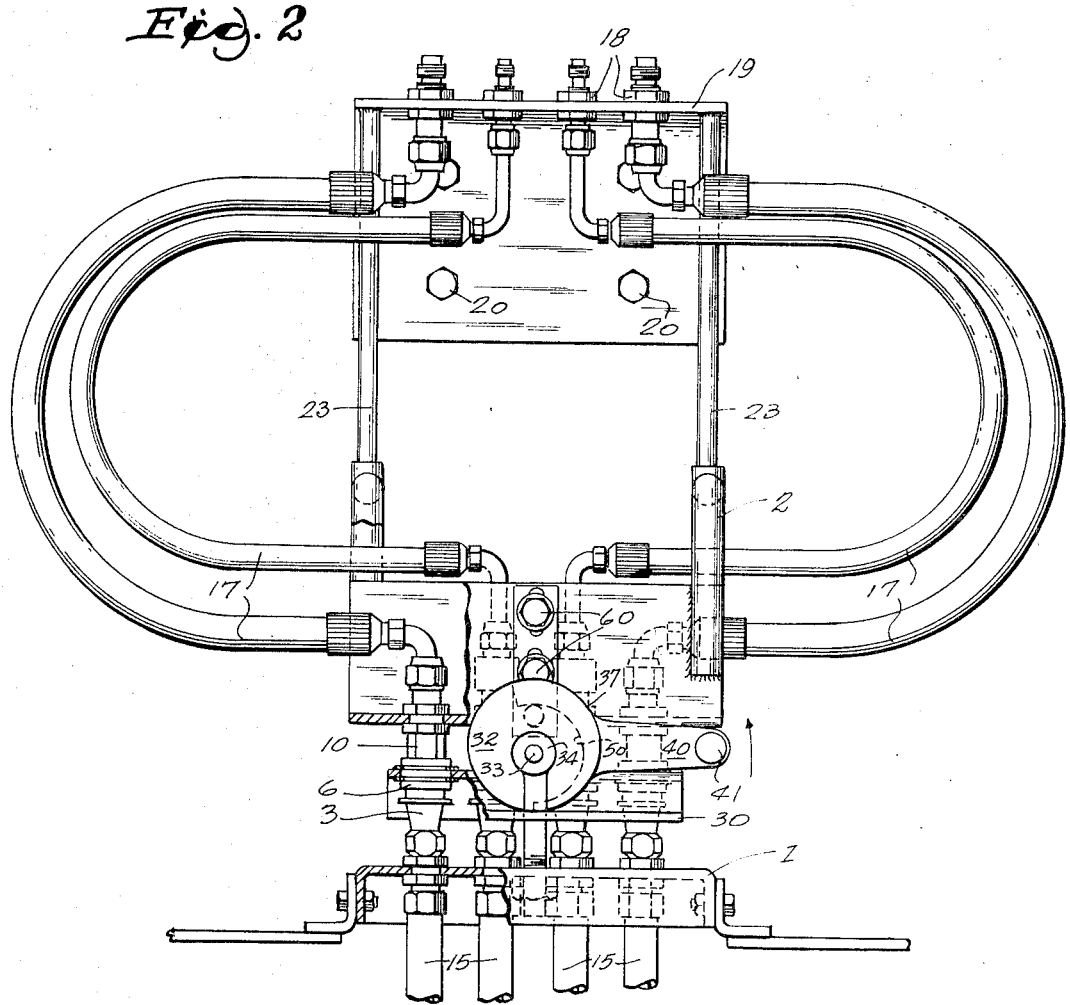
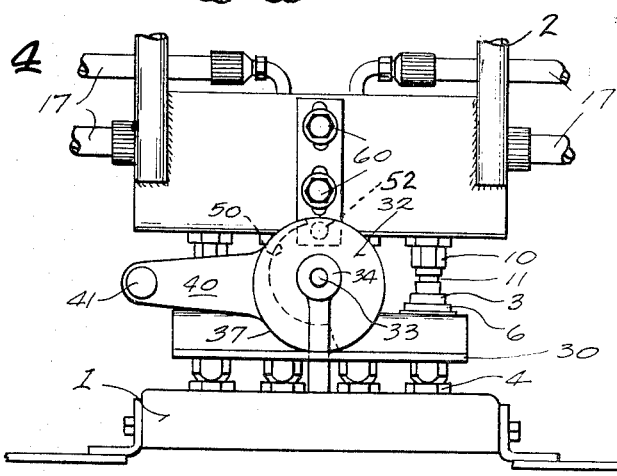

Sept. 8, 1970 T. M. LARSON 3,527,480
MULTIPLE FLUID COUPLING CONNECTION MECHANISM
Filed March 17, 1969 3 Sheets-Sheet 3

INVENTOR:
THOMAS M. LARSON

BY: James E. Nilles
ATTORNEY

United States Patent Office 3,527,480
Patented Sept. 8, 1970

3,527,480
MULTIPLE FLUID COUPLING CONNECTION MECHANISM
Thomas M. Larson, Milwaukee, Wis., assignor to Harnischfeger Corporation, Milwaukee, Wis., a corporation of Wisconsin
Filed Mar. 17, 1969, Ser. No. 807,598
Int. Cl. F16l *39/00*
U.S. Cl. 285—85                    12 Claims

ABSTRACT OF THE DISCLOSURE

Quick releasable connection mechanism for multiple couplings for fluid handling, including a common operator for all of the disconnectable couplings.

BACKGROUND OF THE INVENTION

The invention pertains to releasable fluid conduit couplings having a valve means that prevent fluid flow when the coupling is disengaged.

An example of a prior art coupling of the general type to which the present invention relates is shown in the U.S. Pat. No. 2,628,850, issued Feb. 17, 1953, entitled "Releasable Conduit Connection With Automatic Valving." Another example is shown in the U.S. Pat. No. 1,327,031, of Jan. 6, 1920, entitled "Train Pipe Coupling."

SUMMARY OF THE INVENTION

The present invention provides a connection mechanism for a plurality of fluid couplings, which mechanism has a single lever for simultaneously connecting or disconnecting all of the couplings in a positive manner. More specifically, the mechanism includes a pair of double surface cams operated by said single lever, and a cam follower plate that simultaneously unlocks the locking collars of all of the couplings; and when the lever is swung in the coupling engaging direction, the follower plate holds the collars in the unlocked position until the male and female portions of the couplings are again joined together.

The above mechanism simultaneously applies force evenly to all of the couplings to provide a smoothly and easily operated single lever for a multiplicity of couplings.

These and other objects and advantages of the present invention will appear as this disclosure progresses, reference being had to the accompanying drawings.

BRIEF DESCRIPTION OF THE DRAWINGS

FIG. 2 is another elevational view of the mechanism taken generally along the line 2—2 in FIG. 1;

FIG. 4 is a view similar to FIG. 2 but with certain parts removed for clarity and showing the actuating lever swung to the coupling disengaged position;

DESCRIPTION OF A PREFERRED EMBODIMENT

The mechanism provided by the present invention includes a support member 1 which may be rigidly attached to one portion of a machine (not shown), such as an operator's module which is fixed in a stationary position on the machine. The mechanism also includes a shiftable bracket 2 which is mounted so as to be shiftable from the coupling engaged position shown in FIGS. 1 and 2 to a coupling disengaged position as shown in FIG. 4.

Figure 5:
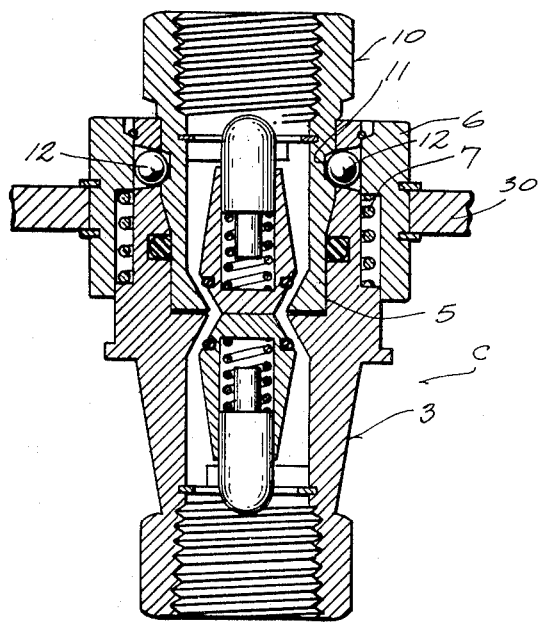
FIG. 5 is a cross-sectional view through one of the couplings shown in the other figures, but on an enlarged scale.
Figure 6:
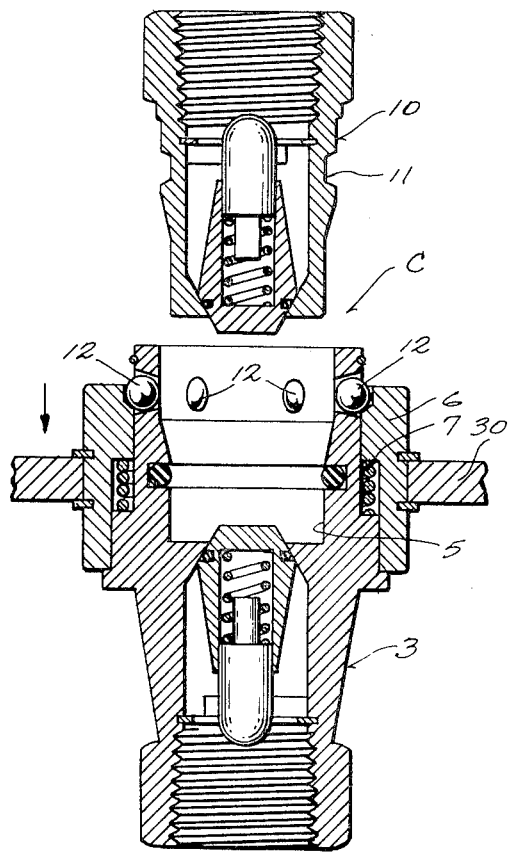
FIG. 6 is a view similar to FIG. 5 but showing the coupling in a disconnected position.

A plurality of disengageable couplings C are attached to the fixed support 1 and the shiftable bracket 2. More specifically, the couplings C each comprise a female socket 3 which is secured by lock nuts 4 to the support 1. These female sockets include a recess 5 (FIG. 5) and have a locking collar 6 shiftably mounted thereon. A spring 7 urges the collar in an outward direction in which it locks the coupling together as will appear. As shown in the drawings, a series of these female sockets are rigidly mounted on the support 1 with their recesses facing the shiftable bracket 2.

The male portions 10 of the couplings are rigidly secured to the shiftable bracket 2 and are each aligned with their respective female sockets on the support 1. These male portions have a stud which is adapted to be inserted into the female socket when the coupling is engaged and when in this position, the coupling is opened to permit fluid to be passed therethrough. The stud has an annular groove 11 therearound in which the series of balls 12 of the female member are adapted to be urged by the locking collar 6 when the latter is pushed by its spring 7 into the locking position.

Figure 1:
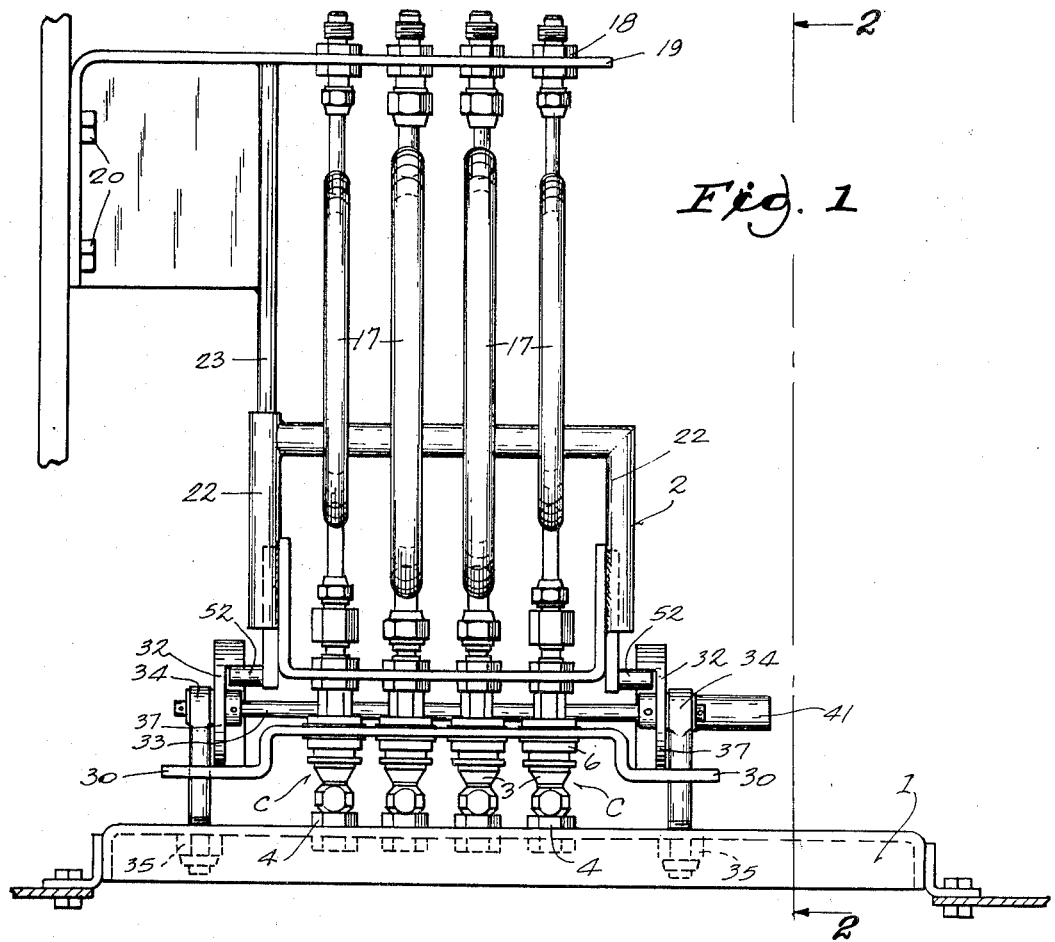
FIG. 1 is an elevational view of a connection mechanism embodying the present invention.
Figure 3:
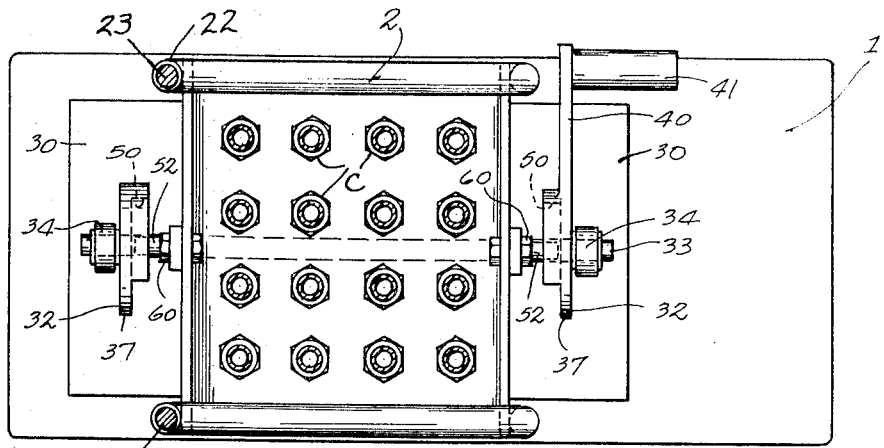
FIG. 3 is a plan view of the mechanism, certain parts being removed for clarity.

In order to disengage the couplings from the engaged position shown in FIG. 1, it is necessary to push the locking collars away from the male portion, thus permitting the balls to be removed from the groove in the male stud. The male stud is also spring urged to the outward position when the coupling is disconnected to thereby act as a check valve to prevent flow of fluid when the coupling is not connected.

The female couplings have conduits 15 extending from their ends for transmission of fluid to any desired location. The ends of the male coupling portions have conduits 17 extending therefrom and which are connected at their other ends to fittings 18 carried by a fixed bracket 19. The fixed bracket 19 may be secured by bolt means 20 to another portion of the machine (not shown).

The shiftable bracket 2 comprises a pair of tubular members 22 which are in telescoping relationship with the pair of aligned members 23 fixed to the bracket 19. Thus, the male coupling portions carried by the bracket 2 can be reciprocated between the coupling engaged position shown in FIG. 1 and the coupling disengaged position shown in FIG. 4. Because many of these couplings may be involved in one mechanism, it is necessary that they all be simultaneously engaged and disengaged and that one does not become engaged or disengaged before another. This simultaneous actuation of all of the couplings is accomplished as follows.

A cam follower plate 30 is secured to each of the locking collars 6 so that they are all connected together. Cam operated means are provided for shifting the plate in a direction away from the male coupling portions so as to cause disengagement of the couplings. This cam operated means includes a pair of rotary cams 32 which are mounted on a single shaft 33 carried in the eye portion of eye-bolts 34. The eye-bolts 34 extend through the support 1 and have a lock nut 35 on their ends. The cam follower plate is slideably mounted on the eye-bolts 34 and the rotary cams 32 have an external or peripheral cam surface 37 which abuts against the cam follower plate 30. The cams 32 are rigidly fixed to the shaft 33 as is the single lever 40 having a handle portion 41. The lever 40 can be rotated through an arc of about 180 degrees, that is from the coupling engaged position shown in FIG. 2 and to the coupling release position shown in FIG. 4. Thus, as the lever 40 is rotated in one direction or the other, it acts to rotate the cam 32. When the lever 40 is swung from the coupling engaged position shown in FIG. 2 in the direction of the curval linear arrow, the external surface 37 of the cams bear against the opposite ends of the cam follower plate and thereby force the latter in a direction away from the male coupling members. This movement of the plate carries with it the locking collars 6, thus permitting the couplings to be disengaged due to the action of the spring 7 forcing the male studs outwardly of the male coupling portion. In this manner, the couplings are disconnected and the flow of fluid therethrough is prevented.

The rotary cams also have an internal cam surface 50 which abuts against the cam follower studs 52 rigidly carried on the reciprocable bracket 2. Referring again to the movement of the lever in the coupling disengaged direction as shown by the curval linear arrow in FIG. 2, when the lever 40 is swung in that direction to release the couplings, the cam surface 50 is so formed that it moves in a direction away from the cam studs 52 thereby permitting the reciprocal bracket 2 to move in a direction away from the female sockets of the couplings.

After the couplings have been disconnected as above described and it is desired to again connect them for fluid flow therethrough, the lever 40 is swung from the position shown in FIG. 4 back to the position shown in FIG. 2. During this swinging movement, the cam surface 50 of the rotary cams bear against the cam follower studs 52 and progressively and evenly pull the upper bracket 2 along with its associated male coupling portions in a direction toward the female sockets. When the lever 40 has reached the position shown in FIG. 2, the sockets have been fully engaged in the female portions and then the springs 7 acting against their respective collars 6 urges the latter toward the locking position, carrying with them the cam follower plate 30. When the collars have thus been shifted by their springs, the locking balls engage the groove of the male stud thereby locking the couplings together. It will be noted that cam follower plate 30 remains in the disengaged position until all of the couplings have been fully engaged and then the plate is free to slide on its supporting bolts 34 into the coupling engaged position because the external cam surface 32 has moved to permit movement of the follower plate toward the male couplings.

RESUME

The mechanism of the present invention provides relatively shiftable frame members each carrying a portion of the disconnectable couplings. A single cam lever actuates a pair of widely spaced, rotary cams which smoothly shift all of the locking collars of the couplings into the coupling disengaged position. When the cam lever is swung in the opposite direction, it pulls the opposite, complementary coupling members toward one another so that they are fully engaged and during which time the cam has moved away from the cam follower plate, thereby permitting the locking collars to simultaneously shift into the coupling locking position. The flexible conduits 17 provide for shifting of the reciprocal frame 2 relative to the stationary bracket 19.

In order to insure that all of the couplings are simultaneously engaged and disengaged at the same time, the nuts 35 of the eye-bolts can be threadably adjusted on the bolts. Further adjustment can also be made as to the relative position of the cam follower studs 52 on the bracket 2 by means of the bolt means 60 which secure the cam follower studs to the bracket 2. Thereby a precise adjustment of the various parts can be readily made to insure positive and smooth actuation of the couplings. The lever 40 provides an even force simultaneously to all of the couplings.

What is claimed is:

1. Quick actuating mechanism for simultaneously engaging and disengaging a multiplicity of fluid couplings, said couplings each including a female socket and a male stud portion insertable in said socket, and locking means for locking said male stud in said socket, said mechanism comprising, a fixed support for rigidly supporting said female sockets, a cam follower plate connecting all of said locking means together, a shiftable bracket, said male stud portions fixed to said bracket and in alignment with their respective female sockets for shifting between a position in which said stud portions are engaged in their respective sockets and a position away from said sockets in a coupling disengaged position, cam means mounted between said fixed support and said shiftable bracket and for engagement therewith, said cam means being engageable with said cam follower plate, and means for actuating said cam means in one direction to force said cam follower plate and its associated locking means to a coupling disengaged position, and in another direction to shift said shiftable bracket and its associated male stud portions toward said female sockets and into a coupling engaged position.

2. Mechanism as described in claim 1 further characterized in that said cam means comprises a pair of rotary cams located in spaced apart relationship on said fixed support, and said means for actuating said cam means comprises a lever connected to said rotary cams for rotation thereof.

3. Mechanism as defined in claim 2 further characterized in that said cams have a peripheral cam surface for engagement with said follower plate.

4. Mechanism as defined in claim 1 further characterized in that said locking means comprises a shiftable collar mounted on said female socket, and spring means carried by said socket for biasing said collar to a coupling locking position.

5. Mechanism as set forth in claim 4 further characterized in that said rotary cam means comprises a pair of rotary cams located in spaced apart relationship on said fixed support, and said means for rotating said cam means comprises a lever connected to said rotary cams for rotation thereof.

6. Mechanism as defined in claim 5 further characterized in that said cams have a peripheral cam surface for engagement with said follower plate.

7. A quick releasable connection mechanism for a multiplicity of disconnectable fluid couplings; said couplings each including a female socket and a male stud portion insertable therein, and locking means for locking said socket and stud portion together; said mechanism comprising, a fixed support for rigidly supporting said female sockets, a cam follower plate connecting all of said locking means together, a shiftable bracket, said male stud portions fixed to said bracket in alignment with their respective female sockets and for shifting between a position in which said stud portions are engaged in their respective sockets and a position away from said sockets in a coupling disengaged position, rotary cam means mounted on said fixed support and engageable with said cam follower plate, cam follower means carried by said shiftable bracket and engageable with said rotary cam means, and means for rotating said cam means in one direction to force said cam follower plate and its associated locking means to a coupling disengaged position, said means also rotating said cam means in another direction to shift said shiftable bracket and its associated male stud portions toward said female sockets and into a coupling engaged position.

8. Mechanism as set forth in claim 7 further characterized in that said rotary cam means comprises a pair of rotary cams located in spaced apart relationship on said fixed support, and said means for rotating said cam means comprises a lever connected to said rotary cams for rotation thereof.

9. Mechanism as defined in claim 8 further characterized in that said cams have a peripheral cam surface abuttable against said cam follower plate.

10. Mechanism as defined in claim 7 further characterized in that said locking means comprises a shiftable collar mounted on said female socket, and spring means carried by said socket for biasing said collar to a coupling locked position.

11. Mechanism as set forth in claim 10 further characterized in that said rotary cam means comprises a pair of rotary cams located in spaced apart relationship on said fixed support, and said means for rotating said cam means comprises a lever connected to said rotary cams for rotation thereof.

12. Mechanism as defined in claim 11 further characterized in that said cams have a peripheral cam surface abuttable against said cam follower plate.

References Cited

UNITED STATES PATENTS

| | | | |
|---|---|---|---|
| 1,327,031 | 1/1920 | Genin | 137—595 |
| 2,575,870 | 11/1951 | Gates | 285—312 X |
| 2,628,850 | 2/1953 | Summerville | 251—149.7 |
| 2,738,991 | 3/1956 | Rieser | 285—137 X |
| 3,214,195 | 10/1965 | Zahurance et al. | 285—137 X |
| 3,298,715 | 1/1967 | Stehle | 285—277 X |

DAVE W. AROLA, Primary Examiner

U.S. Cl. X.R.

285—137, 312, 316